(12) United States Patent
Minhas et al.

(10) Patent No.: US 8,425,674 B2
(45) Date of Patent: Apr. 23, 2013

(54) SYSTEM USING UNUTILIZED HEAT FOR COOLING AND/OR POWER GENERATION

(75) Inventors: Bhupender S. Minhas, Bridgewater, NJ (US); Ian A. Cody, Adelaide (AU); Don E. Stratton, Kingwood, TX (US); Sebastian C. Reyes, Hellertown, PA (US); Charanjit S. Paur, South Bound Brook, NJ (US); Erick D. Gamas-Castellanos, Crystal Lake, IL (US); Mohsen S. Yeganeh, Hillsborough, NJ (US); Thomas F. Degnan, Moorestown, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 368 days.

(21) Appl. No.: 12/603,243

(22) Filed: Oct. 21, 2009

(65) Prior Publication Data

US 2010/0132359 A1    Jun. 3, 2010

Related U.S. Application Data

(60) Provisional application No. 61/193,051, filed on Oct. 24, 2008.

(51) Int. Cl.
*F25B 17/08* (2006.01)
*B01D 53/04* (2006.01)

(52) U.S. Cl.
USPC .............................................. 96/126; 62/480

(58) Field of Classification Search .................... 96/108, 96/121, 126, 146; 62/476, 480, 481
See application file for complete search history.

(56) References Cited

U.S. PATENT DOCUMENTS

| | | | |
|---|---|---|---|
| 3,594,983 A * | 7/1971 | Yearout | 95/97 |
| 4,009,575 A | 3/1977 | Hartman, Jr. et al. | |
| 4,559,736 A * | 12/1985 | Sienkiewicz | 43/42.25 |
| 4,622,210 A * | 11/1986 | Hirschberg et al. | 422/144 |
| 4,694,659 A * | 9/1987 | Shelton | 62/106 |
| 5,087,597 A * | 2/1992 | Leal et al. | 502/62 |
| 5,137,558 A | 8/1992 | Agrawal | |
| 5,213,593 A * | 5/1993 | White, Jr. | 95/99 |
| 5,237,827 A | 8/1993 | Tchernev | |
| 5,386,705 A | 2/1995 | Jones | |
| 5,823,003 A | 10/1998 | Rosser, Jr. et al. | |

(Continued)

FOREIGN PATENT DOCUMENTS

| | | |
|---|---|---|
| DE | 10062174 A1 | 6/2001 |
| EP | 1353112 A1 | 4/2002 |

(Continued)

OTHER PUBLICATIONS

PCT Application No. PCT/US2009/005774, Communication from the International Searching Authority, Form PCT/ISA/206, dated Jan. 29, 2009, 4pgs.

(Continued)

Primary Examiner — Frank Lawrence, Jr.
(74) Attorney, Agent, or Firm — Glenn T. Barrett; Malcolm D. Keen

(57) ABSTRACT

A sorption system is disclosed that includes a sorbent material and a fluid, in which the sorbent material and fluid in combination have a pressure index of at least 1.2.

17 Claims, 5 Drawing Sheets

P1 > P2
T1 > T2 > T3

U.S. PATENT DOCUMENTS

| | | | |
|---|---|---|---|
| 5,846,295 A * | 12/1998 | Kalbassi et al. | 95/105 |
| 6,490,875 B2 | 12/2002 | Chua et al. | |
| 7,033,421 B1 | 4/2006 | Smith et al. | |
| 7,282,189 B2 | 10/2007 | Zauderer | |
| 7,404,846 B2 * | 7/2008 | Golden et al. | 95/103 |
| 7,726,402 B2 | 6/2010 | Ramakrishnan et al. | |
| 2002/0035849 A1 | 3/2002 | Tanaka et al. | |
| 2002/0124727 A1 * | 9/2002 | Hauck | 95/148 |
| 2003/0037672 A1 * | 2/2003 | Sircar | 95/96 |
| 2004/0045434 A1 * | 3/2004 | Golden et al. | 95/96 |
| 2005/0086971 A1 | 4/2005 | Wells | |
| 2007/0215350 A1 | 9/2007 | Kresnyak et al. | |
| 2010/0132359 A1 | 6/2010 | Minhas et al. | |
| 2011/0232305 A1 * | 9/2011 | Minhas et al. | 62/79 |
| 2011/0232493 A1 * | 9/2011 | Yeganeh et al. | 96/146 |
| 2011/0239692 A1 * | 10/2011 | Minhas et al. | 62/480 |
| 2011/0302932 A1 | 12/2011 | Hopkins | |

FOREIGN PATENT DOCUMENTS

| | | |
|---|---|---|
| FR | 2675890 A1 | 4/1992 |
| WO | 9716685 A1 | 5/1997 |
| WO | 0122010 A1 | 3/2001 |
| WO | 2005073644 A1 | 8/2005 |
| WO | 2006135871 A2 | 12/2006 |
| WO | 2007111738 A2 | 10/2007 |

OTHER PUBLICATIONS

Wang et al., Colossal Cages in Zeolitic Imidazolate Frameworks as Selective Carbon Dioxide Reservoirs, Nature, May 8, 2008, pp. 207-211, vol. 453, Nature Publishing Group.

Singapore Search Report issued Oct. 5, 2012 in corresponding Singapore Application No. 201102178-9, 6 pgs.

Singapore Written Opinion issued Oct. 5, 2012 in corresponding Singapore Application No. 201102178-9, 8 pgs.

* cited by examiner

SYSTEM USING UNUTILIZED HEAT FOR COOLING AND/OR POWER GENERATION

FIELD OF THE INVENTION

The present invention relates to methods and systems of employing sorbent materials to provide refrigeration or to power a driver device, such as a drive shaft, particularly in chemical processing and petroleum refining operations.

BACKGROUND OF THE INVENTION

Chemical processing operations, including petroleum refining and petrochemical operations, are energy intensive. It is often necessary to conduct these operations at high temperatures using high temperature heat sources including but not limited to steam. After the steam and other hot streams have performed the intended functions, there remains unutilized energy. Refineries and petrochemical facilities typically utilize only 70% of the input energy needed to conduct processing of crude oil to products.

In an effort to increase energy efficiency, it is desirable to recover and utilize unutilized heat. One prior art method disclosed in U.S. Pat. No. 5,823,003 to Rosser et al attempts to make use of waste heat and apply such heat to an adsorbent material in order to release an adsorbed gas at higher pressure, which in turn can be used in a refrigeration cycle that contains an expansion valve. U.S. Pat. No. 5,823,003 discloses the use of a zeolite-water pairing.

Current methods to obtain refrigeration from sorbent materials in chemical process applications have limitations. Often the sorbent materials and gases employed in sorption systems require other process equipment such as pumping devices, that are expensive to maintain, unreliable and require a large allocation of space. Such limitations often render the recovery of the unutilized heat economically unsustainable.

Accordingly, there remains a need to make unutilized heat recovery efforts more cost-effective by providing the opportunity to utilize lower and higher grades of unutilized heat, to reduce equipment and space requirements of the process. There also remains a need to provide other uses, besides refrigeration, of the fluid released from unutilized heat-charged sorbent materials.

SUMMARY OF THE INVENTION

By proper selection of the absorbent material and the fluid, sorption systems can be provided that are efficiently powered by lower temperature unutilized heat and require no supplemental equipment (e.g., compressors and pumps).

Accordingly, one embodiment of the present application provides a sorption system including an adsorbent material and a fluid, in which the sorbent material and fluid in combination have a "pressure index" of at least 1.2 depending on the type of unutilized heat stream. For higher temperature unutilized heat streams (e.g., between 600K and 1200K), the pressure index is at least 1.2. For lower temperature unutilized heat streams (e.g., less than 600K), the sorbent material and fluid in combination have a pressure index of at least 1.5. In a preferred embodiment, the pressure index is at least two, or at least three, or at least four, or at least six, or at least eight, depending upon the intended application. In another preferred embodiment, the pressure index is a low grade heat pressure index. Generally, the pressure index is based on the internal vessel pressure of a vessel that contains the adsorbent and fluid in a desorption mode under prescribed conditions that are described in greater detail below The present application also provides a process for providing cooling or refrigeration including selecting a refrigerant fluid and an adsorbent material adsorbing the refrigerant fluid into the adsorbent material; heating the adsorbent material to desorb the refrigerant fluid from the adsorbent material and directing the desorbed refrigerant fluid to a device to expand the desorbed refrigerant fluid for refrigeration, in which the adsorbent material and fluid in combination have a pressure index of at least 1.2. While the present invention is described in connection with refining and/or petrochemical applications, the present invention is not introduced to be so limited. It is contemplated that the use of the pressure index, and the sorbent material and fluid combination as application outside of the refining and petrochemical field, including but not limited to use as a passive cooling in a dwelling.

The present application also provides a process for generating electricity or work that includes selecting an adsorbent material and a fluid, adsorbing the fluid into the adsorbent material, heating the adsorbent material to desorb the fluid from the adsorbent material, and directing the desorbed fluid to drive a driver device to generate electricity or work. It is contemplated that the electricity generated may be used within the refinery or petrochemical plant or introduced into the electrical grid for use by the surrounding areas.

The present application also provides an adsorption system that includes a vessel in communication with a heat source, the vessel containing an adsorbent material and a fluid, the sorbent material selected from zeolites, silicagel, carbon, activated carbon, metal organic frameworks (MOFs), and zeolitic imidazolate frameworks (ZIFs), and the fluid selected from carbon dioxide, methane, ethane, propane, butane, ammonia, the chlorofluorocarbon refrigerants commonly known as Freon (trademark, DuPont) and other known refrigerants.

BRIEF DESCRIPTION OF THE DRAWINGS

The invention will now be described in conjunction with the accompanying drawings in which.

DETAILED DESCRIPTION OF THE INVENTION

The present invention will now be described in greater detail in connection with the figures and the following terms. As used herein, the term "sorbent material" refers to a material that reversibly binds to the fluid. Sorbent materials include, but are not limited to, adsorbents.

As used herein, the term "fluid" or "working fluid" refers to a liquid or gas that can reversibly bind to the sorbent material.

As used herein, the term "driver device" refers to a turbine, shaft or other suitable mechanism driven by a fluid to generate electricity or perform work.

As used herein, the term "vessel" refers to an enclosed container suitable for containing an adsorbent material and a fluid under suitable conditions to permit adsorption and desorption of the fluid in the sorbent material.

As used herein, the term "unutilized heat" or "unutilized heat source" refers to the residual or remaining heat source (e.g., steam) remaining following the processing operation after the heat source has been used for its primary purpose in the refining or petrochemical processing operation. Unutilized heat is also referred to as waste heat. The unutilized heat or unutilized heat source refers to a heat source that is no longer any use in the refining and/or petrochemical processing operation and would traditionally be discarded. The unutilized heat can be provided as a unutilized heat stream. For example, but not limitation, unutilized heat can include steam that was employed in a heat exchanger used in petroleum and petrochemical processing, and is of no value to current processes and is being discarded.

As used herein, the term "pump" refers to a physical device that assists in transporting fluids from one place to another.

In accordance with one aspect of the present application, a sorption system is provided. The sorption system recovers unutilized heat from a unutilized heat stream. The unutilized heat source may be used heat from a heat exchanger, or other process area of a chemical processing plant or petrochemical refining plant. The sorption system includes at least one vessel containing a sorbent material or a mixture of sorbent materials and a working fluid or a mixture of working fluids, and at least one unutilized heat source operatively connected to the vessel, such that unutilized heat from the unutilized heat source can be transferred to the sorbent material and fluid contained within the vessel.

Figure 5:
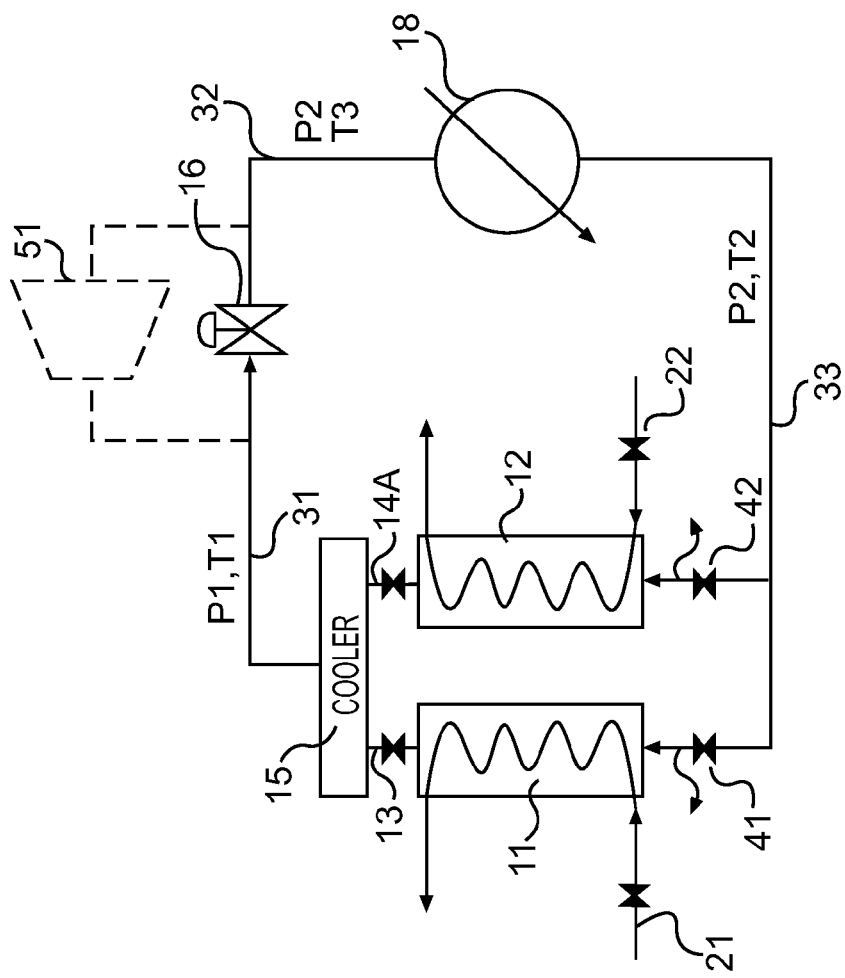
FIG. 5 is a schematic of an adsorption system in accordance with an embodiment of the present invention.

A sorption system 10 in accordance with one aspect of the present invention is illustrated in FIG. 5. The sorption system 10 includes a first adsorption vessel 11 and a second adsorption vessel 12. A unutilized heat stream 21 passes through the first adsorption vessel 11. Unutilized heat contained in the stream 21 passes through the walls of line containing the stream into the first adsorption vessel 11. A unutilized heat stream 22 passes through the second adsorption vessel 12. Unutilized heat contained in the stream 22 passes through the walls of line containing the stream into the second adsorption vessel 12. A unutilized heat stream 22 passes through the second adsorption vessel 12. The unutilized heat streams 21 and 22 may supply from the same unutilized heat source or the separate unutilized heat sources.

The first and second adsorption vessels 11 and 12 are operatively connected to a pressure damper/cooler 15. A valve assembly 13 is interposed between the first adsorption vessel 11 and the cooler 15. The valve assembly 13 functions like a back pressure regulator, which permits the working fluid to escape from the first adsorption vessel 11 at a predetermined or pre-set pressure. The predetermined or pre-set pressure may range from ~170 psig to ~3400 psig, which is dependent upon the amount of sorbent material contained in the vessel and the temperature of the waste stream. A valve assembly 14 is interposed between the second adsorption vessel 12 and the cooler 15. Like the first valve assembly 13, the second valve assembly 14 functions like a back pressure regulator, which permits the working fluid in the second adsorption vessel to escape from the second adsorption vessel 12 at the pre-set pressure. A line 31 extends from the cooler 15. The working fluid contained in the cooler 15 and the line 31 has a pressure of P1 and a temperature of T1.

In accordance with one aspect of the present invention, the line 31 is connected to an expansion valve 16. When the working fluid passes through the expansion valve 16 into the line 32, the temperature of the working fluid drops from T1 to T3 such that T1>T3 and the pressure of the working fluid drops from P1 to P2 such that P1>P2. With such an arrangement, the working fluid can be used to provide cooling for a heat exchanger 18, which is operatively coupled to line 32. As the working fluid passes through the heat exchanger 18, the temperature of the working fluid increases from T3 to T2 such that T2>T3 and T1>T2 in response to withdrawing heat from the other fluid passing through the heat exchanger 18. The pressure of the working fluid remains close to P2.

The working fluid is returned to the first adsorption vessel 11 and the second adsorption vessel 12 via a return line 33. The temperature of the working fluid is T2 and the pressure is P2. A valve 41 controls the flow of working fluid from the return line 33 to the first adsorption vessel 11. A valve 42 controls the flow of working fluid from the return line 33 to the second adsorption vessel 12. When the working fluid is returned to the first adsorption vessel 11, the working fluid is adsorbed onto the sorbent material contained in the first adsorption vessel 11. When the working fluid is returned to the second adsorption vessel 12, the working fluid is adsorbed onto the sorbent material contained in the second adsorption vessel 12.

The operation of the system 10 will now be described in greater detail. In accordance with the present invention, the first and second adsorption vessels 11 and 12 operate in tandem. The working fluid flows into the first adsorption vessel 11 when the valve 41 is open. The valve 41 remains open until equilibrium is established within the first vessel 11. The unutilized heat stream 21 passes through the first vessel 11 such that the sorbent material and the working fluid are heated, which results in the desorption of the working fluid from the sorbent material. This increases the pressure of the working fluid contained in the first vessel 11. Once the pre-set pressure is reached, the working fluid is released from the first vessel 11 via valve assembly 13, such that the working fluid is released into the cooler 15 and the line 31. The working fluid has a pressure of P1 and a temperature of T1 within line 31. When the expansion valve 16 is operated, the pressure and temperature of the working fluid drops to a pressure of P2 and a temperature of T3 in the line 32.

The working fluid is passed through the heat exchanger 18 to cool the fluid contained therein. In accordance with the present invention, the heat exchanger 18 is used to cool a process stream for a refining or petrochemical processing operation. With such an arrangement, the unutilized heat, which normally would be lost, is recaptured and used to perform cooling of another process stream. It is also contemplated that the working fluid can be used to cool water to provide cooling water to an overhead condenser in a distillation tower. It is also contemplated that the cooling performed by the working fluid may be used to recover gas molecules from a fuel stream. The present invention is not intended to be limited for use in process streams in refining and petrochemical processing applications. It is contemplated that the heat exchanger can be used in connection with a building cooling system located in one of the buildings located at the facility such that the unutilized heat can be used to cool one or more of the buildings.

After the passing through the heat exchanger 18, the working fluid enters return line 33. The temperature of the working fluid is T3 and the pressure remains close to P2. The valve 41 is closed such that the working fluid does not return to the first vessel 11; rather, the valve 42 is open such that that working fluid can flow into the second adsorption vessel 12. The valve 42 remains open until equilibrium is established within the second vessel 12. The unutilized heat stream 22 passes through the second vessel 12 such that the sorbent material and the working fluid are heated, which results in the desorption of the working fluid from the sorbent material. This increases the pressure of the working fluid contained in the second vessel 12. Once the pre-set pressure is reached, the working fluid is released from the second vessel 12 via valve assembly 13, such that the working fluid is released into the cooler 15 and the line 31. The working fluid has a pressure of P1 and a temperature of T1 within line 31. The working fluid passes through the system, as described above. After passing through the heat exchanger, the working fluid is returned to the first adsorption vessel 11.

The first and second adsorption vessels 11 and 12 operated in tandem such that one is operating in an adsorption mode when the other is operating in a desorption mode and vice versa. With such an arrangement, the first and second vessels 11 and 12 operate to provide a continuous supply of working fluid to the cooler 15 and line 31 at pressure P1.

In accordance with an aspect of the present invention, the expansion valve 16 can be replaced with a driver device 51 (e.g., a turbine). The working fluid passes through the driver device to either generate electricity or perform work by driving a shaft or other suitable mechanism, whereby the temperature and pressure of the working fluid would decrease as described above. The working fluid could then be used in the heat exchanger 18. It is also contemplated that expansion valve 16 and the driver device 51 can be used in tandem in order to perform both power generation and refrigeration.

The sorption system includes a sorbent material or a mixture sorbent materials and a working fluid or a mixture of working fluids. The sorbent material and fluid in combination have a pressure index of at least 1.2, or at least 1.5, or at least 2, or at least 3, or at least 4, or at least 6, or at least 8. In various embodiments, the pressure index may be a low level heat pressure index (e.g., for unutilized heat applications below 600K), or a high level heat pressure index (e.g., for unutilized heat applications between 600K and 1200K). Various combinations or sorbent materials and fluids are considered to be within the scope of the present invention provided such combinations satisfy the desired pressure index. It should be noted that a combination that is suitable for application with a higher temperature unutilized heat stream may not be applicable for a lower temperature unutilized heat stream. The determination of the pressure index is described below in greater detail.

The adsorbent material in the sorption system has an average heat of sorption (O) between about 2 kcal/mole and about 20 kcal/mole, or more preferably between about 3 kcal/mole and about 10 kcal/mole.

In one embodiment of the present application, the working fluid is selected from carbon dioxide, methane, ethane, propane, butane, ammonia, or the chlorofluorocarbon refrigerants commonly known as Freon or other suitable refrigerant. The adsorbent material is selected from zeolites, silicagel, adsorbing polymers, carbon, activated carbon, metal organic frameworks (MOFs), and zeolitic imidazolate frameworks (ZIFs). In one embodiment the fluid is carbon dioxide and/or the adsorbent material is a zeolite. In one embodiment the fluid is carbon dioxide and the zeolite is a zeolite X, preferably a zeolite 13X.

In accordance with another aspect of the present application, a process for providing refrigeration is provided. The process for providing refrigeration includes, selecting a refrigerant fluid and a sorbent material, sorbing the refrigerant fluid into the sorbent material, heating the sorbent material to desorb the refrigerant fluid from the sorbent material, and directing the desorbed refrigerant fluid to an instrument to expand the desorbed refrigerant fluid for refrigeration. The process preferably employs a sorbent system, as described above. The sorbent material and fluid in combination have a pressure index of at least 1.5, or at least 2, or at least 3, or at least 4, or at least 6, or at least 8. In various embodiments, the pressure index may be a low level heat pressure index, or a high level heat pressure index.

In accordance with an aspect of the present invention, the sorbent system and the processes described herein do not require the use of a pump or additional components to facilitate movement of the working fluid through the system.

Another aspect of the present application provides a process for generating electricity or work. The process for generating electricity or work includes selecting a sorbent material or a mixture of sorbent materials and a fluid or a mixture of working fluids, sorbing the fluid into the sorbent material, heating the sorbent material to desorb the fluid from the sorbent material, and directing the desorbed fluid to drive a driver device to generate electricity or work. The sorbent material and fluid in combination have a desorbed:sorbed pressure index of at least 1.2 (for high temperature unutilized heat applications), at least 1.5, or at least 2, or at least 3, or at least 4, or at least 6, or at least 8. The process preferably utilizes a sorbent system, described above.

Pressure Index

Embodiments of the present application employ a "pressure index" that can be determined at various desorbing temperatures, which is used to determine suitable combinations of a sorbent material and a fluid. The pressure index is determined by the following method. One hundred (100) grams of sorbent material are placed in a 1 liter vessel designed to be isolated from associated equipment with existing valves on both ends of the vessel. The vessel also has indicators to measure inside pressure and temperature. The vessel is flushed and filled with a pure fluid (e.g., $CO_2$) at one atmospheric pressure. The sorbent material adsorbs fluid and the sorbent may heat up. The vessel is equilibrated at 298 K and 1 atmospheric pressure, this sorbing pressure being defined as $P_I=1.0$. The vessel is heated to a pre-selected desorbing temperature (e.g. 348 K). When the vessel and sorbent material reach the pre-selected desorbing temperature, the internal vessel pressure is measured to determine $P_F$. The pressure index is defined as the ratio of $P_F$ to $P_I$.

As noted above, preferred embodiments of the present application make use of a lower temperature of unutilized heat. In order to select a sorbent material/fluid combination that is preferred for use with low level heat (e.g. sorption systems that utilize low grade unutilized heat), it is often desirable or necessary to ascertain at least the low level heat pressure index, as determined above. A pressure index of at least 1.5 is generally appropriate for use in low level unutilized heat applications. Nevertheless, other embodiments of the present invention may use high level heat sources. Thus in these embodiments, it is desirable to select a high level heat pressure index. In such cases, combinations of sorbent material and working fluid may have a pressure index as low as 1.2.

Exemplary Embodiment Using Zeolite 13X and $CO_2$

Figure 1:
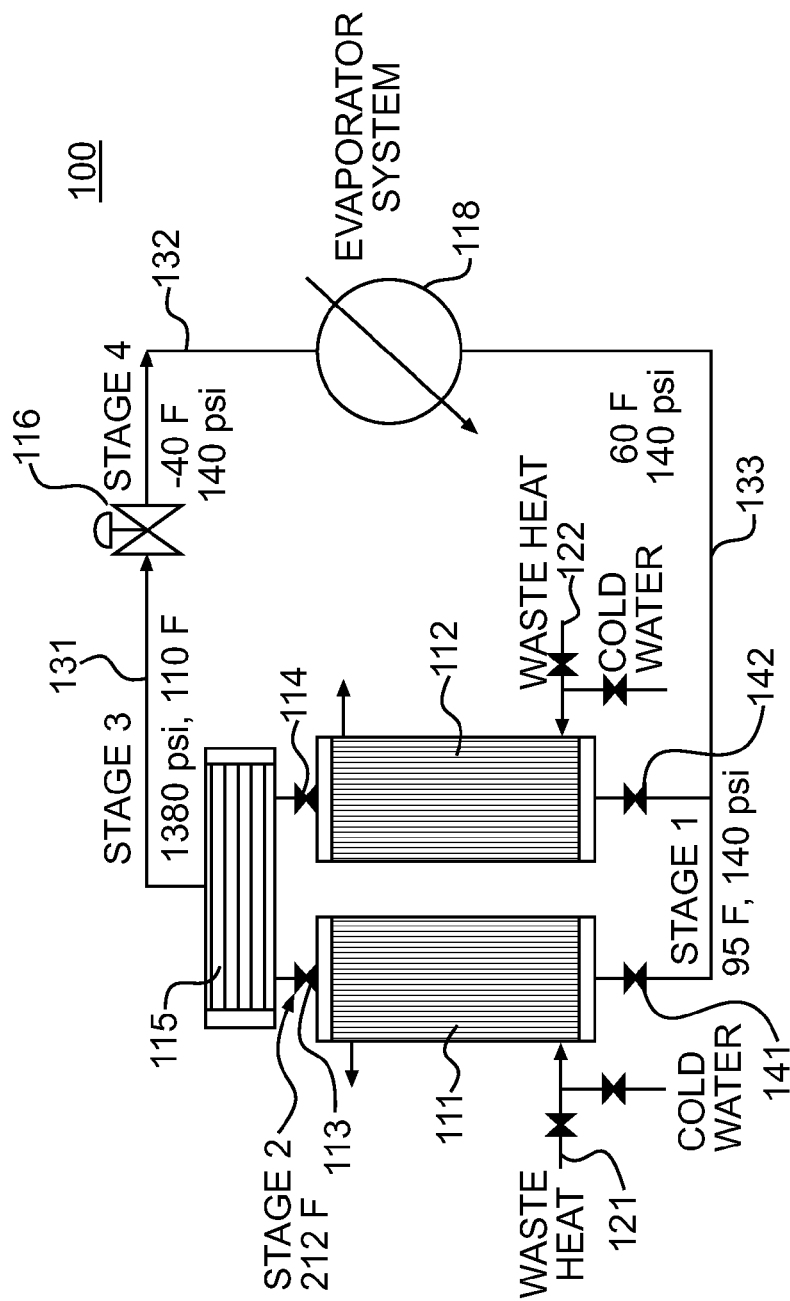
FIG. 1 is a schematic of an exemplary embodiment of the present application which employs zeolite 13X as the adsorbent material and carbon dioxide as the fluid and utilizes unutilized heat to achieve a temperature of about 212° F.
Figure 2:
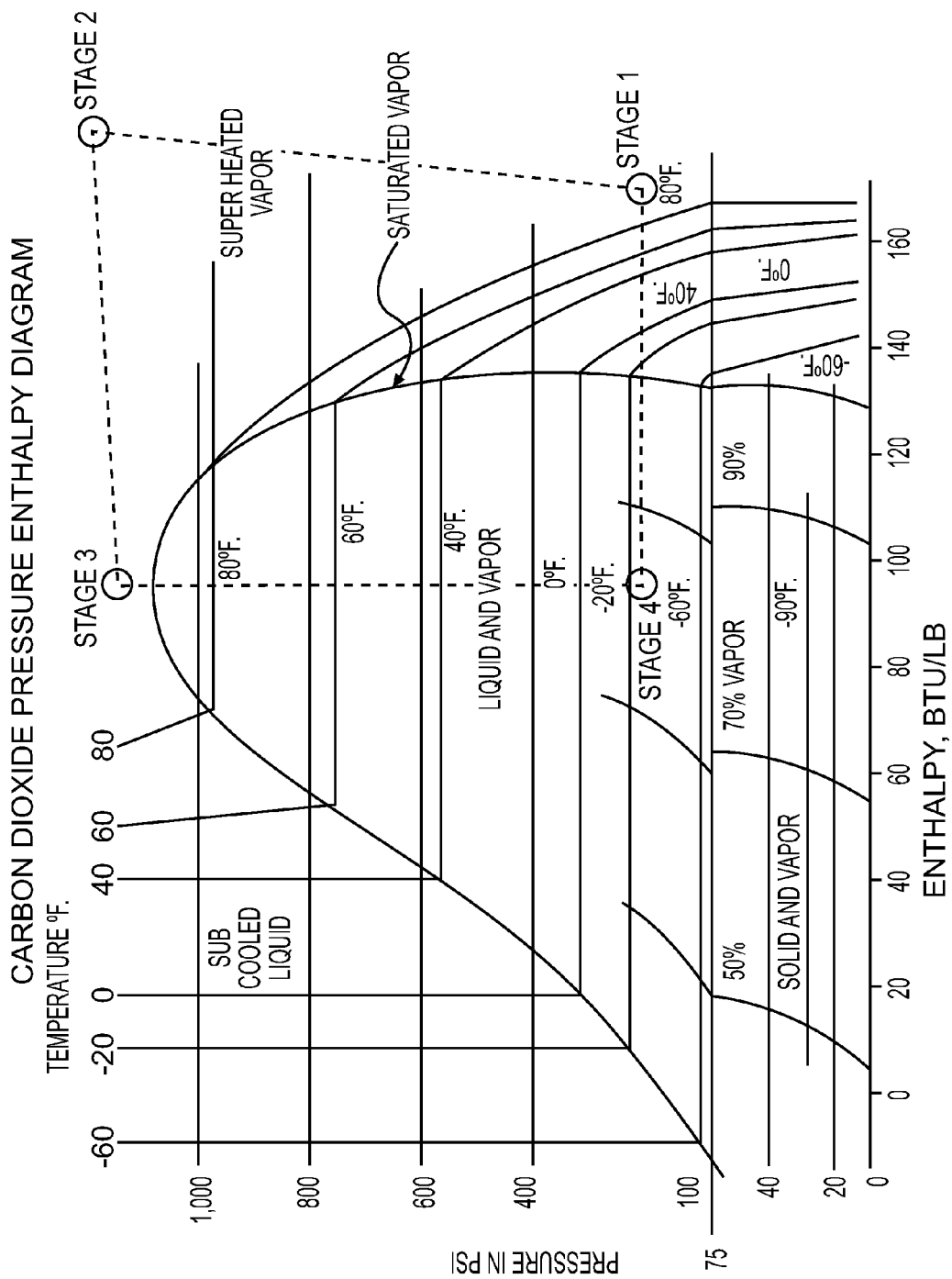
FIG. 2 is a Mollier Diagram annotated to show four points that correspond to four stages of the exemplary embodiment described in FIG. 1.
Figure 3:
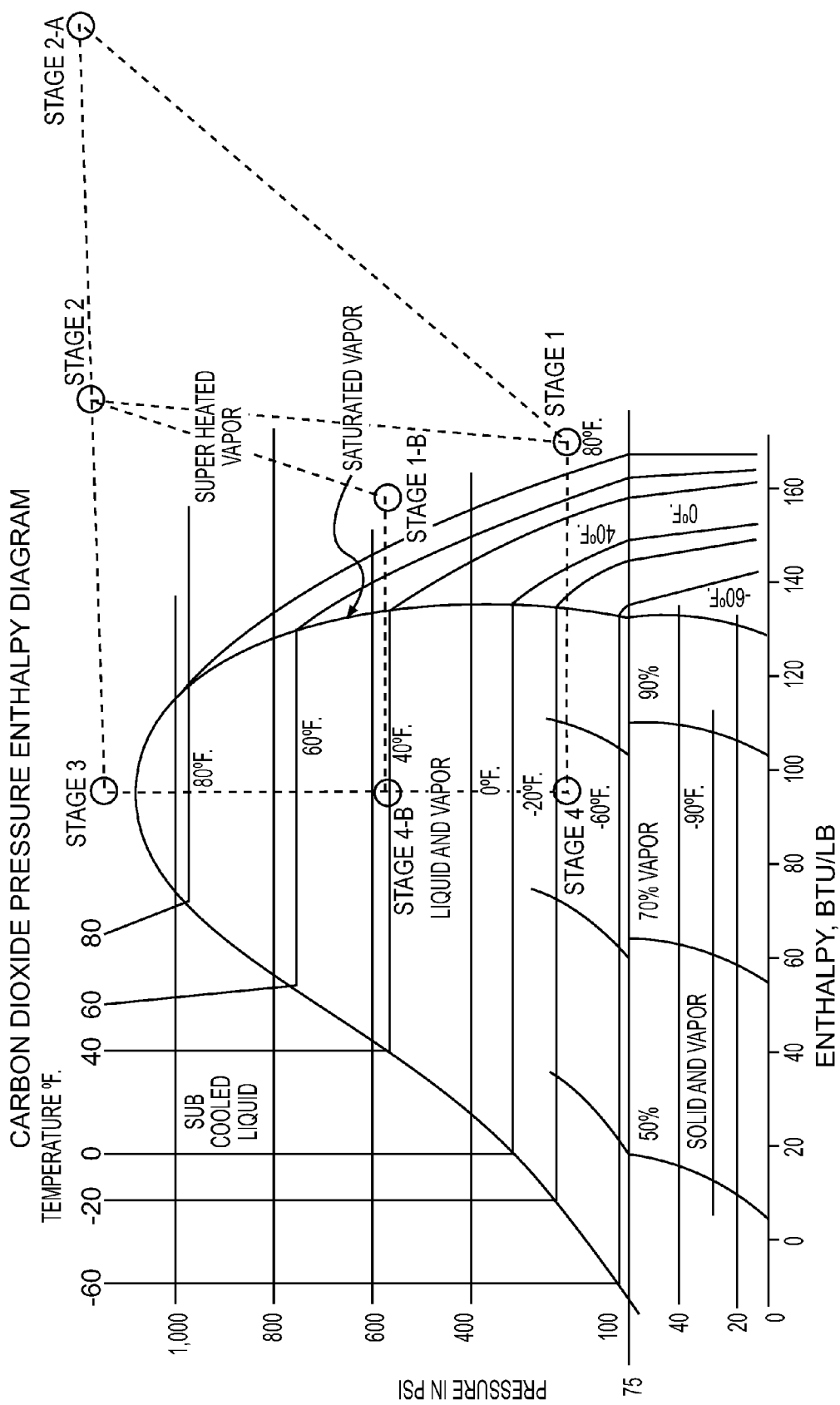
FIG. 3 is a Mollier Diagram annotated to show alternative process points based on the use of unutilized heat to achieve a temperature of about 450° F. and alternative process points based on the use of higher sorbing pressures.

For purposes of illustration and not limitation, a zeolite 13X/$CO_2$ sorption chilling system 100 is provided in one representative embodiment of the present application, as depicted schematically in FIG. 1. A Mollier Diagram for carbon dioxide at various temperatures and pressures for this embodiment is shown in FIGS. 2 and 3 for reference. In this embodiment, two vessels 111 and 112 are maintained in an adsorption mode and a desorption mode, respectively. When on vessel is in the adsorption mode, the other vessel is in the desorption mode and vice versa. In the present embodiment, the sorbent material is zeolite 13X. The working fluid is $CO_2$. For the vessel in the adsorption mode, carbon dioxide is adsorbed by the zeolite 13X at a pressure of about 140 psi and a temperature of about 95° F. These conditions are denoted in FIG. 2 as Stage 1.

After adsorption is complete, the adsorbent bed is isolated by operating the relevant valve (e.g., valve 141 for vessel 111 or valve 142 for vessel 112) and heated using unutilized heat from petroleum refining or chemical processes. The adsorption mode may last for several seconds (e.g., 10 seconds) to several minutes. The duration of the adsorption mode varies based upon the adsorbent material and fluid selected. Unutilized heat is applied to the vessel in order to desorb the $CO_2$, thus initiating the desorption mode. Using the unutilized heat, the vessel is heated to about 212° F. in this particular embodiment. A pressurized stream is generated due to desorption of $CO_2$ from the 13X sorbent material as the adsorbent bed heats to 212° F. In response to operation of a back pressure regulator valve ((i.e., valve 113 for vessel 111 or valve 114 for vessel 112), high pressure $CO_2$ is released from the vessel to pressure damper or cooler 115 at a preset pressure (e.g., ~1400 psig), which is denoted in FIG. 2 as stage 2. The temperature of the $CO_2$ is approximately 212° F.

The pressurized $CO_2$ stream is cooled to the pressure damper/cooler 115 to approximately 110° F., which is denoted as stage 3 in FIG. 2. As a result, the pressure of the cooled $CO_2$ stream in the line 131 is approximately 1380 psi (P1) and the temperature is approximately 110° F. The cooled working fluid stream is subsequently expanded adiabatically using an expansion valve 116 to about 140 psi (P2) and −40° C. (T3), which is denoted as stage 4 in FIG. 2. The expansion valve 116 may be a flow restrictor or a needle valve to restrict but not stop flow. This cooled stream can be used as a high quality refrigeration load for many different applications within refineries or similar facilities where unutilized heat is readily available. For example, the refrigerated $CO_2$ can be directed to a heat exchanger 118 to chill process streams within refineries and chemical plants.

After performing the refrigeration operation within the exchanger 118, the carbon dioxide of this representative embodiment can have a temperature of about 60° F. to 100° F. (T2) and a pressure of about 140 psi (P2). The carbon dioxide working fluid is then recycled back to one of the vessels for use in a subsequent adsorption mode.

The $CO_2$/zeolite 13X system has a pressure index of greater than 3.5. The pressure index is determined in accordance with the procedure set forth above.

Alternatively, higher temperature heat can be applied to desorb more working fluid molecules from the adsorption bed. As shown in FIG. 3, and for purposes of illustration and not limitation, stage 2 is now stage 2A, in which a higher-temperature unutilized heat source is used to heat the bed to 450° F., instead of 212° F. This pressurized stream is to be cooled to 110° F. before expansion. It, therefore, will require much higher amount of cooling media at stage 2. The efficiency of this alternative system based on a 450° F. heat source, using the selection of zeolite 13X and carbon dioxide, will be significantly lower as it requires higher level of heating and cooling. It is understood, however, that a selection of sorbent material and fluid based on a higher level heat pressure index can produce a sorption system that is better suited for a higher quality of heat.

Alternatively, a system can be operated at lower pressure differentials during adiabatic expansion. FIG. 3 demonstrates a system where stages 1-B and 4-B are at higher adsorption pressures. This will also reduce the efficiency of the system. By not expanding the fluid to a lower pressure cooling may be limited. Nevertheless, such an embodiment can be useful for providing refrigeration.

For purposes of the above discussion, each vessel can be a shell-in-tube type configuration with adsorbents in the tube(s). The vessel may have an inner diameter of about 5 ft and contains tubes having a length of about 20 ft. Other vessel sizes are considered to be well within the scope of the present invention. Furthermore, the present invention is not limited to shell-in-tube heat exchangers, other exchangers and other vessels may be selected based on ordinary skill in the art and are considered to be well within the scope of the present invention.

This representative embodiment is provided for exemplary purposes; neither the application nor the invention is limited to the specific embodiments discussed above, or elsewhere in the application. For example, other adsorbent materials and fluids can be used in the place of, or in addition to, zeolite 13X and $CO_2$.

Adsorbent Materials

As noted above, and as used in this application, the term "sorbent material" or "adsorbent material" refers to a material that reversibly binds the fluid. Sorbent materials include adsorbents.

Sorbent materials that can be used in embodiments of the present invention include, but are not limited to, metal-organic framework-based (MOF-based) sorbents, zeolitic imidazole framework (ZIF) sorbent materials, zeolites and carbon.

MOF-based sorbents include, but are not limited to, MOF-based sorbents with a plurality of metal, metal oxide, metal cluster or metal oxide cluster building units. As disclosed in International Published Application No. WO 2007/111738, which is hereby incorporated by reference, the metal can be selected from the transition metals in the periodic table, and beryllium. Exemplary metals include zinc (Zn), cadmium (Cd), mercury (Hg), beryllium (Be) and copper (Cu). The metal building units can be linked by organic compounds to form a porous structure, where the organic compounds for linking the adjacent metal building units can include 1,3,5-benzenetribenzoate (BTB); 1,4-benzenedicarboxylate (BDC); cyclobutyl 1,4-benzenedicarboxylate (CB BDC); 2-amino 1,4 benzenedicarboxylate (H2N BDC); tetrahydropyrene 2,7-dicarboxylate (HPDC); terphenyl dicarboxylate (TPDC); 2,6 naphthalene dicarboxylate (2,6-NDC); pyrene 2,7-dicarboxylate (PDC); biphenyl dicarboxylate (BDC); or any dicarboxylate having phenyl compounds.

Specific materials MOF-based sorbent materials include: MOF-177, a material having a general formula of $Zn_4O(1,3,5$-benzenetribenzoate$)_2$; MOF-5, also known as IRMOF-I, a material having a general formula of $Zn_4O(1,4$-benzenedicarboxylate$)_3$; IRMOF-6, a material having a general formula of $Zn_4O$(cyclobutyl 1,4-benzenedicarboxylate); IRMOF-3, a material having a general formula of $Zn_4O(2$-amino 1,4 benzenedicarboxylate$)_3$; and IRMOF-11, a material having a general formula of $Zn_4O$(terphenyl dicarboxylate$)_3$, or $Zn_4O$ (tetrahydropyrene 2,7-dicarboxylate$)_3$; and IRMOF-8, a material having a general formula of $Zn_4O(2,6$ naphthalene dicarboxylate$)_3$ and Cu-BTC-MOF, a material having a general formula of $C_{18}H_6Cu_3O_{12}$ (copper benzene-1,3,5-tricarboxylate).

Exemplary zeolitic imidazole framework (ZIF) sorbent materials include, but are not limited to, ZIF-68, ZIF-60, ZIF-70, ZIF-95, ZIF-100 developed at the University of California at Los Angeles and generally discussed in Nature 453, 207-211 (8 May 2008), hereby incorporated by reference in its entirety.

Zeolite adsorbent materials include, but are not limited to, aluminosilicates that are represented by the formula $M_{2/n}O.Al_2O_3.ySiO_2.wH_2O$, where y is 2 or greater, M is the charge balancing cation, such as sodium, potassium, magnesium and calcium, N is the cation valence, and w represents the moles of water contained in the zeolitic voids. Examples of zeolites that can be included in the methods and systems of the present application include natural and synthetic zeolites.

Natural zeolites include, but are not limited to, chabazite (CAS Registry No. 12251-32-0; typical formula $Ca_2[(AlO_2)_4 (SiO_2)_8].13H_2O$), mordenite (CAS Registry No. 12173-98-7; typical formula $Na_8[(AlO_2)_8(SiO_2)_{40}].24H_2O$), erionite (CAS Registry No. 12150-42-8; typical formula (Ca, Mg, $Na_2$, $K_2)_{4.5}[(AlO_2)_9(SiO_2)_{27}].27H_2O$), faujasite (CAS Registry No. 12173-28-3, typical formula (Ca, Mg, $Na_2$, $K_2)_{29.5}[(AlO_2)_{59}(SiO_2)_{133}].235H_2O$), clinoptilolite (CAS Registry No. 12321-85-6, typical formula $Na_6[(AlO_2)_6(SiO_2)_{30}].24H_2O$) and phillipsite (typical formula: $(0.5Ca, Na, K)_3 [(AlO_2)_3(SiO_2)_5].6H_2O$).

Synthetic zeolites include, but are not limited to, zeolite A (typical formula: $Na_{12}[(AlO_2)_{12}(SiO_2)_{12}].27H_2O$), zeolite X (CAS Registry No. 68989-23-1; typical formula: $Na_{86} [AlO_2]_{86} (SiO_2)_{109}].264H_2O$), zeolite Y (typical formula: $Na_{56}[(AlO_2)_{56}(SiO_2)_{136}].250H_2O$), zeolite L (typical formula: $K_9[(AlO_2)_9(SiO_2)_{27}].22H_2O$), zeolite omega (typical formula: $Na_{6.8}TMA_{1.6}[AlO_2)_8(SiO_2)_{28}].21H_2O$, where TMA is tetramethylammonium) and ZSM-5 (typical formula: $(Na, TPA)_3[(AlO_2)_3(SiO_2)_{93}].16H_2O$, where TPA is tetrapropylammonium).

Zeolites that can be used in the embodiments of the present application also include the zeolites disclosed in the Encyclopedia of Chemical Technology by Kirk-Othmer, Volume 16, Fourth Edition, under the heading "Molecular Sieves," which is hereby incorporated by reference in its entirety.

Synthetic zeolite sorbent materials are commercially available, such as under the Sylosiv® brand from W.R. Grace and Co. (Columbia, Md.) and from Chengdu Beyond Chemical (Sichuan, P.R. China). For example, Sylosiv® A10 is one commercially available zeolite 13X product.

Fluids

As noted above, the term fluid refers to a liquid or gas that reversibly binds to the adsorbent material. Non-limiting examples of fluids that can be used in accordance with the present application include carbon dioxide, methane, ethane, propane, butane, ammonia, or the chlorofluorocarbon refrigerants commonly known as Freon or other suitable refrigerants satisfying the above-described pressure index.

Selection of Sorbent Materials and Fluids

In accordance with another aspect of the invention, a method is provided for selecting a sorbent material and a fluid for use in combination in a waste-heat sorbent system within a chemical processing or petrochemical refining operation. The method generally includes providing an adsorbent material in a vessel, introducing a fluid into the vessel to a predetermined adsorbing pressure, allowing the chamber to reach equilibrium at the predetermined adsorbing pressure (e.g. 1 atm), securing the chamber to prevent the escape of fluid, heating the secured chamber to a predetermined temperature (e.g., 348K), measuring internal pressure within the secured chamber after the sorbent material has reached the predetermined temperature and selecting the sorbent and the fluid for use in combination if the measured internal pressure within the secured chamber is at least 1.5 times the adsorbing pressure. In one embodiment, the sorbent material and the fluid for use in combination is selected if the measured internal pressure within the secured chamber is at least two times, or at least three times, or at least four times, or at least six times, or at least eight times the sorbing pressure. The adsorption system can be used to provide refrigeration, to drive a turbine to provide electricity or to drive a work shaft or other driver to perform work.

Heat of Sorption

Preferably, the sorbent material and fluid couple has an average heat of sorption (Q) from about 2 kcal/mole to about 20 kcal/mole, and more preferably from about 4 kcal/mole to about 10 kcal/mole for heat sources up to 600K. The heat of sorption should be between 2 kcal/mole to about 40 kcal/mole if a higher temperature heat source (e.g., great than 600K and up to 1200K) is available. The sorbent material should also have a high capacity for the fluid.

Figure 4:
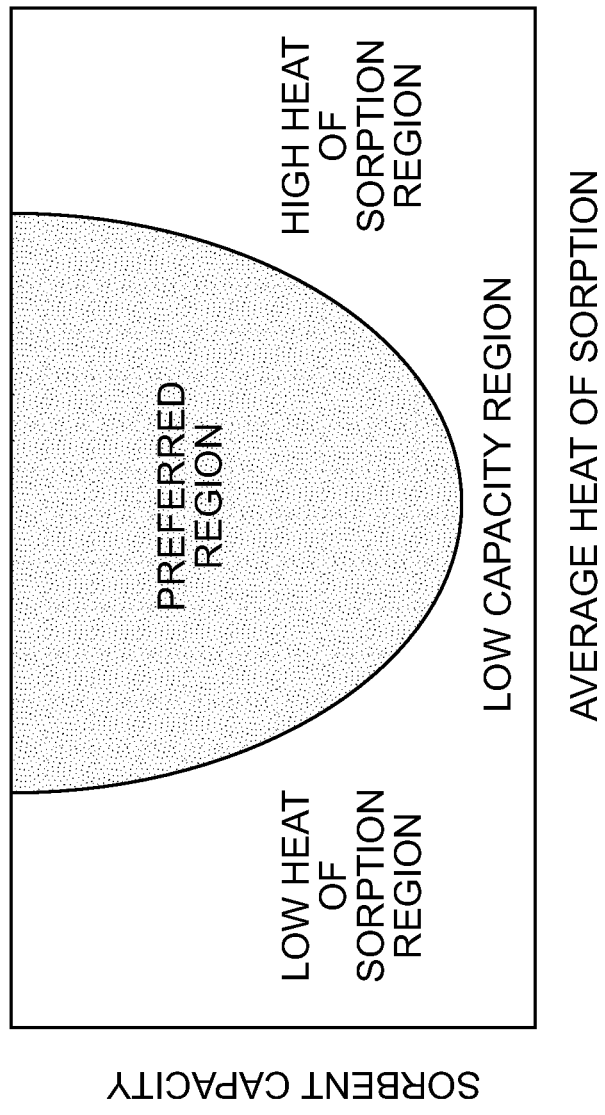
FIG. 4 is a graph which plots adsorbent capacity along the y-axis and average heat of adsorption along the x-axis.

FIG. 4 demonstrates the influence of these two factors in the selection of a fluid and sorbing material. As shown on the left side of the FIG. 4, labeled the "Low Heat of Sorption Region," the sorbent/fluid couple generally has too low of a heat of sorption to provide a suitable pressure "spark" and such a sorbent/fluid is not a proper couple. The bottom of FIG. 4, labeled "Low Capacity Region" demonstrates a region in which the choice of sorbent material provides for a low capacity of the fluid such that, regardless of the heat of sorption, the fluid cannot drive the sorption system. The right side of FIG. 4, labeled "High Heat of Sorption Region" demonstrates a region in which the choice of the sorbent provides too high of a heat of sorption to provide sufficient pressure to drive the sorption system. Hence, the preferred region is labeled accordingly.

Uses of Adsorbent Systems of the Present Application

The adsorbent systems of the present application can be used in various applications provided the setting allows for the presence of a vessel that contains a sorbent material, a supply of fluid, a heat supply and means to effectively direct the desorbed fluid to an expansion device to provide refrigeration or a driver device to provide electricity or work. For example, the desorbed gas may be directed to a Joule-Thompson expansion valve, to provide refrigeration. Alternatively, the desorbed fluid can be directed to a turbine to provide electricity or a work shaft to run a machine to provide work.

Possible applications for sorption systems of the present application include residential (for generating air conditioning in the summer and a heat pump in the winter), vehicular (where the on-board air conditioning utilizes exhaust heat) and industrial (refining and chemical plants).

In a preferred embodiment of the present application, the adsorbent system is used within a chemical or petrochemical plant, and the desorbed fluid is used to provide refrigeration to aid in other process areas, particularly areas that rely on temperature differences to separate components of a mixture. For example, the refrigeration can be used to recover liquefied petroleum gas (LPG, C3+) from flue gases going up a stack, or the refrigeration can be used to operate condensers to improve the effectiveness of vacuum distillation columns, particularly in the summer months.

By proper selection of the adsorbent and fluid, the sorbent system can make effective use of lower grade heat than previously provided by adsorption systems in the prior art. For example, in one embodiment of the present application, the heat supply is "unutilized heat" which has a temperature of from about 70° C. to about 300° C., more preferably from about 90° C. to about 180° C.

The present invention is not to be limited in scope by the specific embodiments described herein. Indeed, various modifications of the invention in addition to those described herein will become apparent to those skilled in the art from the foregoing description and the accompanying figures. Such modifications are intended to fall within the scope of the appended claims.

It is further to be understood that all values are approximate, and are provided for description.

Patents, patent applications, publications, product descriptions, and protocols are cited throughout this application, the disclosures of each of which is incorporated herein by reference in its entirety for all purposes.

The invention claimed is:

1. A sorption system containing a sorbent material and a working fluid and comprising:
   (a) at least one sorption vessel containing the sorbent material;
   (b) means for supplying heat to the sorption material in the sorption vessel to desorb the working fluid from the sorbent material;
   (c) an expander which is connected for flow of the working fluid from the sorption vessel through the expander to expand and cool the desorbed working fluid released from the sorption vessel;
   (d) means for recycling the cooled working fluid from the expander to the sorption vessel, wherein the sorbent material and fluid in combination have a pressure index of at least 1.2.

2. The sorption system of claim 1, wherein the sorbent material and fluid in combination have a pressure index of at least 1.5.

3. The sorption system of claim 2, wherein the sorbent material and fluid in combination have a pressure index of at least three.

4. The sorption system of claim 3, wherein the sorbent material and fluid in combination have a pressure index of at least four.

5. The sorption system of claim 4, wherein the sorbent material and fluid in combination have a pressure index of at least six.

6. The sorption system of claim 2, wherein the sorbent material has an average heat of sorption (Q) for the working fluid between about 2 kcal/mole and about 20 kcal/mole at the sorbing conditions of the sorption system.

7. The sorption system of claim 6, wherein the sorbent material has an average heat of sorption (Q) for the working fluid between about 3 kcal/mole and about 10 kcal/mole at the sorbing conditions of the sorption system.

8. The sorption system of claim 1, wherein the fluid is selected from carbon dioxide, methane, ethane, propane, butane, ammonia and chlorofluorocarbon; and further wherein the sorbent material is selected from zeolites, silica-gel, adsorbing polymers, carbon, activated carbon, metal organic frameworks (MOFs), and zeolitic imidazolate frameworks (ZIFs) and combinations thereof.

9. The sorption system of claim 1, wherein the sorption vessel operatively coupled for heat recovery to an unutilized heat source.

10. The sorption system of claim 9, which includes means for transferring unutilized heat from the unutilized heat source to the sorbent material and working fluid sorbed on the sorbent material to desorb the working fluid from the sorbent material contained within the vessel.

11. The sorption system of claim 1 which comprises two sorption vessels containing sorbent material; means for supplying heat to the sorption material in the sorption vessels to desorb the working fluid from the sorbent material; an expander connected for flow of the working fluid from the sorption vessels to expand and cool the desorbed working fluid released from the sorption vessels; means for recycling the cooled working fluid from the expander to the sorption vessels, and valves to operate the sorption vessels in tandem such that one is operating in an adsorption mode when the other is operating in a desorption mode to provide a continuous supply of working fluid to a driver device.

12. The sorption system of claim 1 which includes a heat exchanger for increasing the temperature of the working fluid after it passes from the expander to the sorption vessel.

13. The sorption system of claim 11 which includes a heat exchanger for increasing the temperature of the working fluid after it passes from the expander to the sorption vessel operating in the adsorption mode.

14. The sorption system of claim 1 in which the expander comprises an expansion valve.

15. The sorption system of claim 1 in which the expander comprises a driver device to expand the gases from the sorption vessel and perform work.

16. The sorption system of claim 11 in which the expander comprises an expansion valve.

17. The sorption system of claim 11 in which the expander comprises a driver device to expand the gases from the sorption vessel and perform work.

* * * * *